Oct. 27, 1959     K. L. MIKESELL     2,909,845
COMPASS
Filed Aug. 20, 1956     2 Sheets-Sheet 1
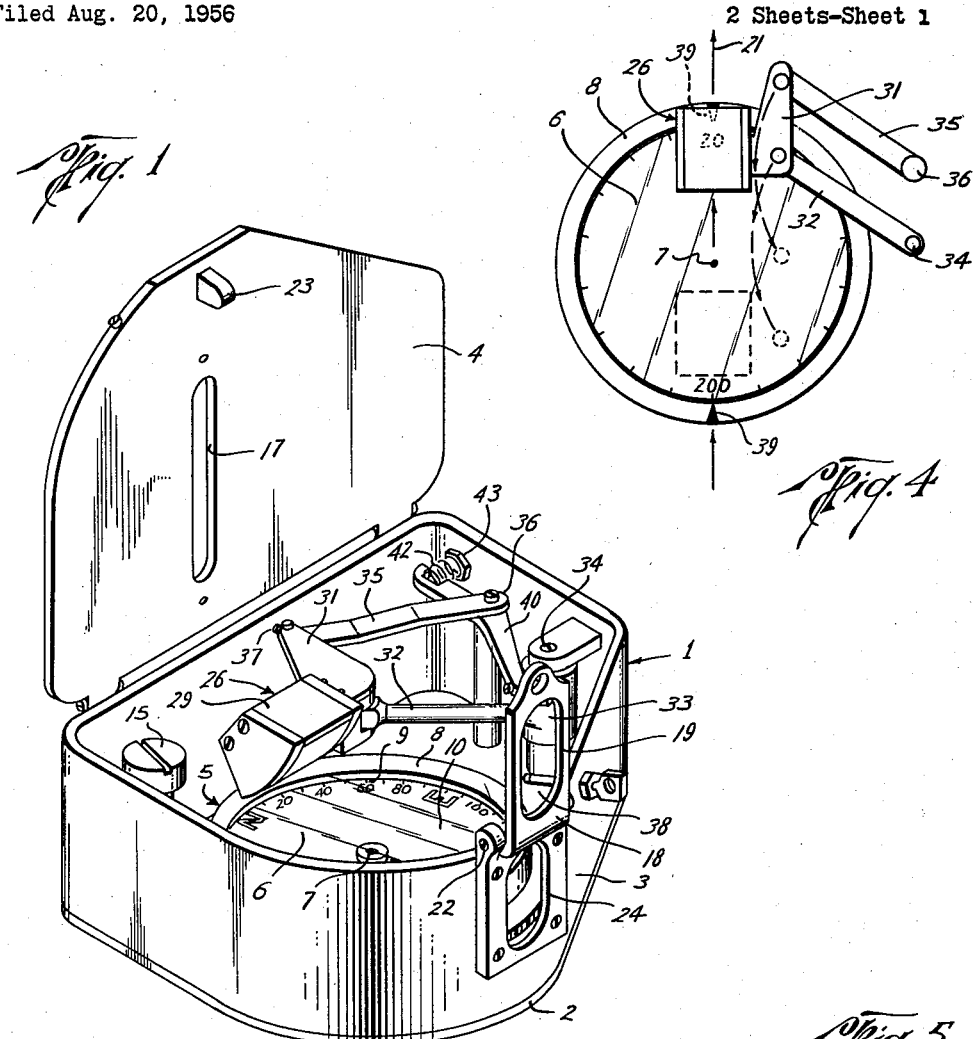
Keith L. Mikesell
INVENTOR.
BY Melvin R. Stidham
ATTORNEY

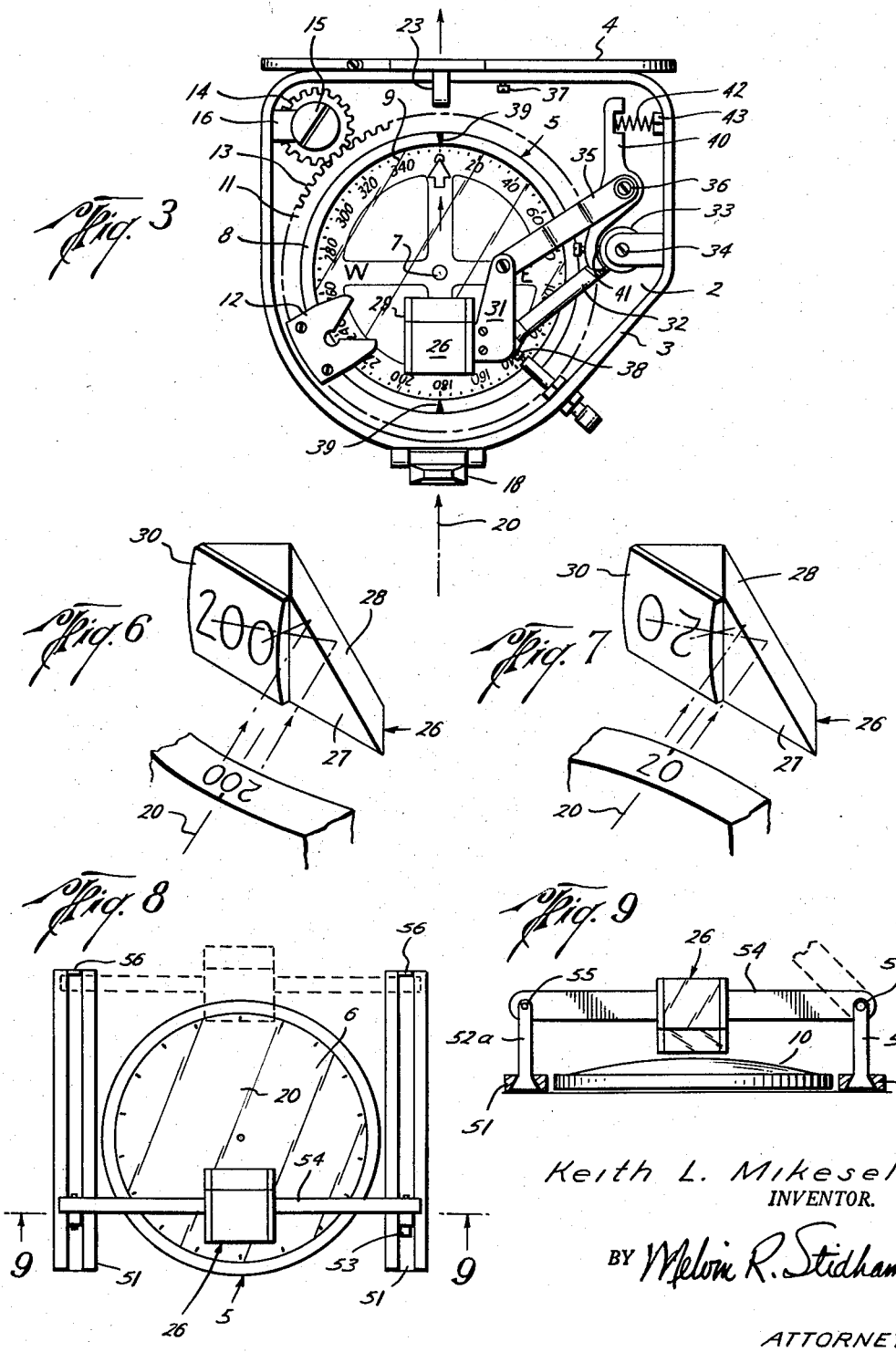

United States Patent Office 2,909,845
Patented Oct. 27, 1959

2,909,845

COMPASS

Keith L. Mikesell, Houston, Tex.

Application August 20, 1956, Serial No. 605,094

2 Claims. (Cl. 33—222)

The present invention relates to magnetic compasses and, more particularly, to a new and useful prismatic reader for a magnetic card compass.

With compasses conventionally used prior to my invention, when it was desired to determine a return course or heading, it was necessary to read the true azimuth and then to calculate the return or reverse azimuth by adding 180°, or if the true azimuth was greater than 180°, to subtract 180° therefrom. Obviously, both the inconvenience and the opportunity for error were multiplied if one wished to retrace a route along which a series of varying courses were followed, since for each course along the return route, the reverse azimuth has to be calculated by adding or subtracting 180° from the true azimuth of each corresponding course of the outward route. Similarly, in establishing one's own position it was necessary to determine the bearing to a plurality of fixed, known points and to then add or subtract 180° to find the reverse direction or azimuth from each known point to the observer before the observer's position could be determined by triangulation.

It is, therefore, an object of my invention to provide a compass by means of which both the true azimuth and the reverse azimuth may be read directly and readily without the necessity of calculation.

It is a further object of my invention to provide a pocket compass upon which a route followed in an outward course may be inscribed in terms of headings and distance, which route may be retraced without necessity of calculation.

It is a further object of my invention to provide a pocket compass which is simple and economical in construction and reliable in operation.

In carrying out my invention, I provide, on a standard card-type compass, a prismatic reader which is selectively movable between two points on the observer's line of sight to make readings 180° apart, with respect to the compass card. By this means both the forward and the rearward edge of the card may be read with respect to a focal reference point to give the true or foresight heading and the reverse or backsight heading, respectively.

While my invention may take different specific forms, I have shown in the accompanying drawings typical embodiments in which the details of my invention will be better understood when viewed in connection with the following description.

For a better understanding of the invention reference should be had to the accompanying drawings wherein:

Fig. 1 is a perspective view of a first embodiment of my pocket compass with case open;

Fig. 2 is a top view of the compass case with cover closed;

Fig. 3 is a top view of the first embodiment of my compass with case open;

Fig. 4 is a top plan view of my compass;

Fig. 5 is a side plan view of my compass;

Figs. 6 and 7 are views in perspective of the prism used with my compass;

Fig. 8 is a top plan view of a second embodiment of my invention; and

Fig. 9 is a side plan view of the second embodiment of my invention.

Referring now to the drawings and particularly to Fig. 1, the numeral 1 indicates a box-like case having a bottom 2, vertical walls 3 and a hinged cover 4. Mounted within the case on the bottom thereof, is a conventional card compass 5 including a calibrated compass card or rose 6 rotatably mounted about a pivot 7 within a frame 8. Adjacent the circumferential edge of the card is a plurality of radial graduations 9 calibrated in a clockwise direction. The card 6 is preferably delineated into degrees from 0° to 360° to conform with standard compass markings and to facilitate direct translation to a map. Additionally, cardinal compass points may be inscribed as shown for convenience. Since the compass card or rose is rotatable about the central pivot 7, it tends to assume a fixed angular relation to the earth's magnetic poles, despite angular displacement of the case, in response to the attraction of a permanent magnet (not shown) affixed to the underside thereof. For protection from dirt, foreign matter and from inadvertent impact, a transparent cover 10 of glass or plastic is sealed around the compass frame 8 to cover the compass card or rose 6.

Surrounding the compass frame 8 and rotatable about the center thereof is a bezel ring 11 on which is carried an arrowhead indicator 12 for setting a specific compass course to be maintained. Preferably, gear teeth 13 are cut around the peripheral edge of the bezel ring so that it may be rotated by means of a pinion 14 which, in turn, is rotated by friction wheel 15 rotatably carried in an arm 16 secured to a vertical wall 3 of the case.

In the hinged cover 4 of the case 1 is a narrow window or slot 17 which, when the cover is open and substantially vertically disposed constitutes a forward sight. Extending above a vertical wall of the case opposite the hinged cover is a window frame, 18 also having a slot 19 which functions as the rearward sight. The forward and rearward sights 17 and 19 are symmetrically disposed with respect to a center line 20 (Fig. 3) of the compass card 6 so that a target may be sighted through the aligned sights along line 21 (Figs. 4 and 5) in the same vertical plane as center line 20 and its bearing determined by reading the compass. Thus, if the compass case were held a short distance from the eye and a given point in the distance viewed through sights 17 and 19 the intersection of the center line 20 with the forward portion of the compass rose 6 would show the true azimuth bearing from the observer's eye to the fixed point and the intersection of the center line with the rearward portion of the compass rose would give the reverse azimuth bearing, from the fixed point to the observer's eye.

Preferably, the rear sight 19 is pivotally mounted to cooperating hinge members 22 extending above the top of the vertical wall so that it may be folded down over the cover 4 when the compass is not in use, in which position it functions in the nature of a latch. Also, I provide a projection 23 on the cover which is also in the vertical plane of sight including center line 20. Thus, it may alternatively function as the forward sight if that is the preference of the observer.

To facilitate reading the true and reverse azimuth bearings without requiring substantial deviation of the line of sight from the target, I provide a viewing window 24 directly below the rear sight 19 so as to be also symmetrical with respect to the center line 20. Thus, the observer may, with a minimum amount of deflection shift his gaze from the target to peer through the window 24 along the line 25 which is coplanar with center line 20. In connection with this viewing window I provide a prismatic reader 26 by means of which images of the compass card calibrations 9 are refracted through the window 24 to the observer's eye. A preferred form of reader, illustrated in Figs. 4 to 7, includes an amici or roof prism which comprises, in effect, a composite of two triangular prisms, a first prism 27 having a horizontal axis and a second prim 28 having a near vertical axis. The roof prism is encased within a protective carrier 29.

The refraction of light through the first prism 27 tends to invert the calibrations and digits 9 when viewed along line of sight 25 or 25a (Fig. 5) and the second prism 28 reverses the graduations and digits, both as shown in Figs. 6 and 7. The end result is the accomplishment of simpler and more accurate readability of the compass since the figures do not appear perverted, as when reflected in a mirror, but are merely inverted. That is, the digits appear as if they were merely being read upside down. Thus, the delineations 9 appearing at the top of the compass card in Fig. 3, in connection with the true or foresight azimuth reading, will appear to be upside down while those at the bottom of the compass card which indicate reverse azimuth or backsight reading will appear right side up since, in both cases the prismatic reader 26 must be positioned beyond the digits, as shown in Fig. 4 i.e. on the side of the digits opposite the observer. As an additional feature of the prismatic reader, I provide a magnifying lens 30 on the upper facet of the first prism to enlarge the refracted image. Additionally a minute light bulb or other source of illumination may be provided on the carrier 29 to cast a beam of light on the digits and graduations being read.

A material feature of my invention resides in the selective adjustment of the prismatic reader into either of two reading positions at opposite sides of the compass card 6 along the center line 20 so that when the calibrations 9 are read in association with a fixed point marking the center line 20 both the true azimuth and the reverse azimuth may be read directly. The selective positioning of the prismatic reader may be accomplished by a variety of means and I have shown two embodiments of my invention, both of which accomplish the desired results. Referring to Figs. 1 to 4 the embodiment includes a lateral extension 31 from the carrier 29 in which reader 26 is encased. Pivoted to the one end of the extension 31 is a link 32 which terminates in a hub 33 pivotally connected at 34 to a vertical wall of casing 1. To the other end of extension 31 is pivoted a second arm 35 which, in turn, is also pivoted at 36 to the case 1. The resultant parallel linkage holds the prismatic reader perpendicular to the center line 20 and enables it to be swung through an arc (Fig. 4) between a true azimuth reading position, as shown in Fig. 1 to a reverse azimuth reading position, as shown in Fig. 3, the reading positions being defined by engagement of the carrier 31 with stops 37 and 38 projecting from the walls of the case 1. Ideally, the reading positions should be determined so that in either case, a portion of the compass card calibrations 9 symmetrical to the vertical plane of sight including center line 20 is refracted to the observer. Since, these positions occur somewhat beyond the calibrations being read, or above the figures in the view of Fig. 4, the pivot 34 about which the prism swings should also be situated beyond the center of the compass.

For reading accuracy, the center line 20 should be marked sufficiently clear to clearly and easily associate the compass card calibrations with the line of sight and thereby determine the true or reverse bearing, as desired. For this purpose, I have shown a pair of needle points 39 fixed to the compass frame 8 to extend inwardly over the outer edge of the compass card and precisely coincident with the center line 20. Of course, I am not limited to this construction since it is apparent that a hair line may be etched or otherwise provided directly to the compass glass or, in fact, to the prism itself.

If desired, provision can be made for locking the prismatic reader 22 in either of the two reading positions. For this purpose, I may provide a rocker arm 40 pivoted at 36 to the case. From the end of rocker arm 40 is projected a pin detent 41 which is engageable with either of two holes in the hub 33 to define the reading positions. A compression spring 42 seated on a lug 43 normally urges the rocker arm 40 into engagement with the hub 33 but it may be released by compressing the spring 42 or by action of cam surfaces which may be formed adjacent the engaging holes.

On the outside of the cover 4, I have etched a series of parallel lines 44 for the purpose of recording conveniently pertinent data such as a plurality of courses that may be followed on a given route.

In operation then, the user may venture into unknown territory along a circuitous route marked by frequent changes of direction. By setting the prismatic reader 26 in its true azimuth reading position he may determine each successive course followed on the outward route. This data may be recorded on the outside of cover 4, no separate note book being required. Assuming he travels at a relatively fixed rate, the distance he travels along each course may also be recorded in terms of time. This is repeated for each course he follows during his outward journey. Then, should he wish to retrace his steps to return to the point of origin, he need merely swing the reader 26 about its pivots 34 and 36 to the reverse azimuth reading position. Thereafter, each course he follows will be in a direction 180° from the indicated azimuth reading. Thus, if he starts with the last course recorded in the outward journey and follows each successive reading in reverse order for the same distance, he will have retraced his steps to the point of origin. Each course on the return route may be read directly and accurately, neither course calculation nor even reference to a separate note book being necessary.

Another extremely useful function of my compass resides in the facility with which it may be used to ascertain one's position with relation to known, fixed points. If the forward and rear sight 17 and 19 are both activated and the compass held a short distance from the eye, preferably about eighteen inches, a target may be sighted along sight line 21 (Figs. 4 and 5) and thereby aligned along center line 20. Then, the line of sight may be shifted downwardly through an infinitesimal arc toward the prismatic reader. If the reader is in its true azimuth or foresight reading position it will indicate the bearing from the user to the target. If, however, the reader 26 is shifted to the reverse azimuth or back sight reading station, the azimuth read in each case will be diametrically opposite, or 180° from, the true azimuth toward the fixed point and will, therefore, give without calculation the bearing from the fixed point back to the observer. This reading may be directly transcribed to a map and, after at least two readings are made the observer's position may readily be determined by triangulation.

Referring now to Figs. 8 and 9 I have shown a modified form of my invention wherein a pair of parallel keyway tracks 51 are provided along the bottom of the case 1, one track being on each side of the compass. Slidably received in each track is a slide 52 and 52a from which there extends a vertical post. Pivotally connected at 53 to the upper end of one post 52 is a bridge or cross arm 54 on which is carried the prismatic reader 26. Projecting rearwardly from the upper end of post 52a is a pin 55 which is adapted to receive a downwardly opening slot in bridge 54. The pivotal connection 53 between the bridge and the slide enables the bridge and prism to be swung out of the way in the event it is desired to read the compass directly or to prevent interference with location of the friction wheel for setting of the course indicator. Stops 56 are provided at opposite ends of the case to define the foresight and backsight reading positions of the prism.

While the preferred embodiments of my invention have been shown and described, it is obvious that many modifications thereof can be made by one skilled in the art without departing from the spirit of my invention. It is, therefore, desired to protect by Letters Patent all forms of the invention falling within the scope of the following claims:

Having described my invention I claim:

1. A magnetic compass comprising a support member, a circular compass rose rotatable on said support member and having a circumferential row of radial calibrations thereon adjacent the outer edge thereof, forward and rear reference indicators on said support member adjacent to the calibrations on said compass rose, said indicators being fixed along a common center line of said compass rose and at diametrically opposite sides thereof, a reader for restricting an observer's view of said compass rose and said support member, said reader being operable in a foresight station to restrict an observer's view to only said forward reference indicator and the portion of said row of calibrations then adjacent thereto and in a backsight station to restrict said observer's view to only the rear reference indicator and a portion of said row of calibrations then adjacent thereto, a reader carriage supporting said reader and mounted on said support member for movement thereon to carry said reader only along a path of travel between said foresight and said backsight stations, and front and rear stop means on said support member engageable by said carriage for positive location of said reader in said foresight and said backsight stations respectively.

2. A magnetic compass comprising a support member, a circular compass rose rotatable on said support member and having a circumferential row of radial calibrations thereon adjacent the outer edge thereof, forward and rear reference indicators on said support member adjacent to the calibrations on said compass rose, said indicators being fixed on a common center line of said compass rose and at diametrically opposite sides thereof, sight means for directing an observer's line of sight along the vertical plane of said common center line, a reader for projecting an image of only a portion of said compass rose and said support member, said reader being operable in a foresight station to project along said vertical plane an image of only said forward reference indicator and the portion of said row of calibrations then adjacent thereto and in a backsight station to project along said vertical plane an image of only said rear reference indicator and the portion of said row of calibrations then adjacent thereto, a reader carriage supporting said reader and mounted on said support member for movement thereon to carry said reader only along a path of travel between said foresight and said backsight stations, and front and rear stop means on said support member engageable by said carriage for positive location of said reader in said foresight and backsight stations respectively.

References Cited in the file of this patent

UNITED STATES PATENTS

| | | |
|---|---|---|
| 2,119,542 | Kaspereit | June 7, 1938 |
| 2,498,768 | Phillips | Feb. 28, 1950 |

FOREIGN PATENTS

| | | |
|---|---|---|
| 14,719 | Great Britain | June 23, 1909 |
| 134,419 | Great Britain | Nov. 6, 1919 |